United States Patent [19]

Keeney

[11] Patent Number: 4,902,425
[45] Date of Patent: Feb. 20, 1990

[54] REMOVAL OF HUMATES FROM BAYER PROCESS LIQUORS

[75] Inventor: Mark E. Keeney, Booragoon, Australia

[73] Assignee: Commonwealth Scientific & Industrial Research, Campbell, Australia

[21] Appl. No.: 136,657

[22] Filed: Dec. 22, 1987

[30] Foreign Application Priority Data

Dec. 24, 1986 [AU] Australia .............................. PH09678

[51] Int. Cl.$^4$ ................................................ C01F 7/02
[52] U.S. Cl. .................................... 210/634; 210/735; 423/130
[58] Field of Search ................. 210/735, 634; 423/130, 423/121, 122

[56] References Cited

U.S. PATENT DOCUMENTS

4,578,255  3/1986  Roe et al. .......................... 423/122 X

Primary Examiner—Frank Spear
Attorney, Agent, or Firm—Ernest A. Beutler

[57] ABSTRACT

A basic liquid ion exchange process in which a side stream of Bayer liquor is treated with a cationic compound preferably in the form of a polymer (poly-DADMAC) to extract a significant amount of the organic contaminants (humates) from the liquor. The contaminant loaded organic layer is separated from the treated liquor (which is returned to the system) and stripped by an alkali metal precipitation technique and the polymer is regenerated.

15 Claims, 6 Drawing Sheets

SIMPLIFIED EXTRACTION PROCESS

REMOVAL OF HUMATES FROM BAYER PROCESS LIQUORS

BACKGROUND OF THE INVENTION

This invention relates to a process for reducing the concentration of humate type organic impurities in Bayer Process liquors derived from the digestion of bauxites with a caustic solution.

THE ORGANIC PROBLEM

Organic contamination of Bayer liquor is a problem of particular importance to Australian alumina producers since Australian bauxites, particularly those in the Darling Range of Western Australia, contain significantly higher levels of organic matter than their counterparts elsewhere in the world. A major portion of the organic matter associated with the bauxite is in the form of complex cellulose and lignin substances which are extremely difficult to characterise. These organics are extracted from the ore during digestion and undergo oxidative attack in the caustic liquor to form "humates" and the sodium salts of a variety of lower molecular weight organic acids. Since the process liquors are continuously recycled to digestion where additional organic extraction from the bauxite occurs, the organic impurity levels build in the liquor stream and become quite significant. Organics are suspected of seriously interfering with hydrate production through a variety of detrimental effects such as increased liquor foaming and precipitator scaling, reduced yields in digestion and precipitation, increased liquor viscosity, poor settling rates in the thickeners and classifiers, poor agglomeration of fines, increased soda contamination and uncontrollable precipitation of sodium oxalate. Therefore, organics must be continually removed from the process liquor to avoid excessive levels of contamination. In most alumina refineries, the only control of organic levels in the liquor is through the residue disposal system where organic impurities absorb onto the mud solids and the loss of liquor to the mud lakes functions as a purge stream. Depending upon the operating conditions of the refinery and the type of bauxite being processed, steady-state organic levels can range between 3–40 g/L as total organic carbon.

Considering the problems that organics can cause in a refinery, the nature of the organic species in Bayer liquors has received very little serious attention in the literature. Where work has been done, most of it has focused on the effects of high molecular weight humic acid salts since humates are suspected of being responsible for the most severe "organic" problems in alumina refineries. The exact composition of these humates is uncertain but they appear to consist of a mixture of complex species, some of which are intensely colored due to extensive conjugation. These particular species impart to the Bayer liquor a characteristic dark, red/orange color and affect the quality of the product hydrate, especially with respect to "whiteness". Humates also stabilize low molecular weight acid salts, such as sodium oxalate, making oxalate removal control difficult.

In order to categorize the impurities present in Bayer liquors, the organic species are often broadly classified into three major groups:

1. Highly colored humate species, freshly extracted from the bauxite, with molecular weights ranging from 500 to 10,000. These humates consist of cellulose, pectate and lignin derivatives which have not been significantly degraded in digestion. Humates usually comprise approximately 1–10% of the total organic species.
2. Slightly colored, intermediate humate degradation products, with molecular weights less than 500. These species constitute the "building blocks" of the larger humate molecules. They include the sodium salts of various benzene carboxylic, phenolic and hydroxyaliphatic acids. The intermediate molecular weight acid salts usually comprise approximately 25–35% of the total organic species.
3. Colorless, low molecular weight humate degradation products including the sodium salts of formic, acetic, lactic succinic and oxalic acids. The low molecular weight acids salts usually comprise approximately 50–65% of the total organic species.

The organics present in Bayer liquors cover an extremely wide molecular range. Most literature reports on the nature of organics in Bayer liquors claim these organics are the result of a continuous degradation process in which the humates are first extracted from the bauxite in digestion with little decomposition. Once in the liquor, the humates are presumed to break down into low molecular weight species during repeated cycling of the liquor through digestion.

However, recent work suggests that for Darling Range bauxites, the entire molecular weight spectrum of the organic contaminants is produced in the first digestion step and that further break down of these organics in subsequent digestion cycles is not extensive. This is extremely significant with respect to organic removal processes which rely on humate removal as a method of controlling liquor organic levels.

ORGANIC REMOVAL PROCESSES

In attempts to minimize the operational problems caused by the organic impurities in Bayer liquors, a number of processes for organic removal have been developed. However, most of the processes suffer problems which make their practical application to alumina refining difficult.

Schepers et al. (U.S. Pat. No. 4,046,855) have developed a process which uses insoluble magnesia compounds to coprecipitate magnesium/aluminium hydroxides with the organics. However, handling problems with the magnesia, solid/liquid separation of the precipitate and loss of alumina make the process cumbersome. A similar process, using barium compounds, has been proposed by Mercer et al. (U.S. Pat. No. 4,101,629) but, in addition to the same operational problems as the magnesia process, the barium precipitation technique presents toxicity hazards. A third alkali metal precipitation process, developed by Matyasi et al. (U.S. Pat. No. 4,335,082) involves the causticisation of the liquor using lime. Subsequent liquor evaporation produces a calcium precipitate containing the organic impurities. The necessity of treating large liquor volumes to make the process viable and the substantial losses of soda associated with solids precipitation make this process expensive and impractical.

A number of the organic removal processes involve the oxidation of the organics to sodium carbonate. A wet oxidation process using a copper catalyst has been developed by Inao et al. (U.S. Pat. No. 4,215,094) in which the organics in the liquor are oxidized at elevated temperatures and pressures. Although effective, the cost and operational problems associated with high pressure vessels makes this process unattractive. Similar problems are experienced with a recent process (U.S. Pat. No. 4,578,255) Kaiser. An oxidation process that is receiving considerable industry attention is one commonly known as "liquor burning". This process, developed by Sato et al. (U.S. Pat. No. 4,280,987), involves the calcination of evaporated, causticised liquor to destroy all organic impurities. Unfortunately, although extremely effective for organic control, it is an expensive, capital intensive process, with considerable operational demands.

In an effort to minimize capital investment, a number of organic removal techniques have been developed to "selectively" remove humates, by either adsorptive processes or chemical reagent addition. The effectiveness of these techniques for organic control, however, are based upon the assumption that the lower molecular weight organic species in process liquors are the result of the continual breakdown of humates in digestion. Presumably, by removing the humate precursors of the lower molecular weight organics, the formation of these species can be eliminated. Gnyra et al. (U.S. Pat. No. 4,275,043) have proposed a humate removal technique based upon the use of adsorbants such as clays or activated alumina and carbon. However, large quantities of adsorbants are required and column regeneration or the separation and recovery of a dispersed adsorbant from the liquor would present tremendous operational difficulties. Lever (U.S. Pat. No. 4,275,042) describes the use of a small amount of an expensive, cationic sequesterant, preferably a fatty quaternary ammonium salt, for precipitating humate species in order to destabilize sodium oxalate. However, the addition of the cationic reagent to the liquor produces an unfilterable, oily precipitate that is very difficult to separate from the liquor. In a recent Nalco/Kaiser patent (U.S. Pat. No. 4,578,255), a water soluble quaternary ammonium based polymer (poly-DADMAC) is used to precipitate humates in a manner nearly identical to the Lever process. However, by mixing the polymer with a liquor process stream at a point in which waste solids capable of adsorbing the viscous precipitate are present (e.g., sand, mud, etc) both humates and the added cationic polymer can be removed from the system along with the waste solids. This process is attractive to industry due to the simplicity of application since little or no capital investment is required. However in refineries where the organic contaminant levels in the processed liquor are extremely high the enormous cost associated with a single pass use of a polymer can be prohibitive.

DADMAC Process Development

The use of poly-DADMAC for humate removal from Bayer liquors is a technique based upon a process originally developed for organic removal from soda ash (trona) process liquors (Keeney U.S. Pat. No. 4,472,280). Research work aimed at liquor impurity removal to improve the crystallisation of soda ash showed that the addition of various cationic reagents to the liquor resulted in the precipitation of certain organic acids, particularly humates, which were contaminating the liquor. A number of cationic reagents were investigated as precipitants, including fatty quaternary ammonium salts and water-soluble, cationic polymers including poly-DADMAC. While poly-DADMAC was found to be quite effective for precipitating humates, the polymer/humate precipitate was difficult to separate from the mother liquor due to the viscous, liquid form. However, the use of an adsorbant solid, particularly bentonite clay, in conjunction with poly-DADMAC greatly improved the ability to filter the precipitate by providing a surface to which the precipitate could adsorb. Furthermore, the polymer/adsorbant combination greatly assisted colour removal and foam suppression.

Based upon the success of the soda ash work, the use of poly-DADMAC in conjunction with adsorbant substrates to remove humates from Bayer process liquors was investigated. Preliminary tests using plant liquors from the Kaiser-Gramercy alumina refinery showed that poly-DADMAC was quite effective for removing highly-coloured, humate material. After treatment with moderate levels (<200 mg/L) of poly-DADMAC, the liquor was substantially lighter in color. This initial work was extremely encouraging since Kaiser was interested in producing "white hydrate" for the synthetic marble market. The molecular weight of the poly-DADMAC (i.e. intrinsic viscosity of the reagent) was found to have no effect on humate removal ability, although copolymerizing DADMAC with acrylamide to obtain extremely high molecular weight polymers reduced the ability of the polymer to precipitate humates. Presumably this was the result of a reduction in the active quaternary ammonium functionality in the copolymers.

Unfortunately, as in trona liquor, the precipitate formed between poly-DADMAC and the humates contaminating the liquor was found to be an unmanagable, viscous oil. The precipitate was impossible to filter without some type of solids addition to act as an adsorbant substrate. The addition of bentonite clay to the Bayer liquor substantially improved the ability to remove the "coascervate". However, the technique was impractical for alumina refining. Due to the large quantities of clay required, the separation problems and operating expenses in removing the coascervate coated clay from the liquor and the potential for clay dissolution with increases in the silica levels of the liquor. Therefore, it was necessary to consider the application of poly-DADMAC at some point in the plant where acceptable process waste solids (i.e., pisolites, sand, red mud, etc.) were already present. This was to ensure that the viscous, oily precipitate would coat the surfaces of the waste solids prior to the solids being removed from the system. Thus, humates would be removed from the liquor and disposed of as waste.

In the initial stages of the process development, the injection of the poly-DADMAC to the thickener overflow ahead of the Kelly or sand filters was considered, coascervate although there was concern that, with Kelly presses, the coated mud particles might blind the filter media. Furthermore, the effect of the poly-DADMAC addition point on process factors such as oxalate stability or solubility, precipitation yield and seed poisoning were unknown. While a variety of poly-DADMAC addition points were considered, the poly-DADMAC/adsorbant-substrate concept needed to be plant-tested to determine the most suitable point for the polymer addition. This work became the basis of the Nalco/Kaiser patent (U.S. Pat. No. 4,578,255) covering the use of poly-DADMAC and other water soluble cationic polymers for humate removal from Bayer liquors.

DADMAC Process Problems

The advantages in using poly-DADMAC in conjunction with Bayer process solids for humate removal include the simplicity of application, the lack of substantial capital investment for equipment and the ability to treat the liquor without interfering with the usual operations of the plant. However, since the poly-DADMAC is discarded after use (i.e., the polymer/humate coascervate reports with the residue to the mud lake), it is critical that the polymer be as efficient as possible with respect to humate precipitation to ensure the process is cost effective.

Unfortunately, little work was done during the development of the humate precipitation process to investigate either the effect of the polymer/humate interaction on humate removal efficiency or the effect of humate removal on liquor steady-state organic levels.

Recent studies on the interaction between humates and poly-DADMAC in process liquors, suggest that, at the application dosages recommended in the Nalco/Kaiser patent, poly-DADMAC precipitates only a very small portion of the total humates from process liquors. This is quite significant, since the favourable economics cited by Nalco for the process are based upon claims that very small amounts of poly-DADMAC are capable of substantial humate reductions (e.g. 200 mg/L treatment reportedly removes 48% of humates from Kaiser-Gramercy Kelly press feed). The inefficiency in humate precipitation by poly-DADMAC liquors has been confirmed after detailed analysis of the data obtained during plant evaluations of the Nalco/Kaiser process in a number of alumina refineries in Australia.

In addition to the basic inefficiency of the Nalco/Kaiser process with respect to humate removal, there could be a serious problem related to sending the precipitated poly-DADMAC/humate coascervate to the mud lakes with the sand as a method of humate disposal. Where lake-water is used to wash to solid residue in the rake classifiers and the washer train or where water is returned to the refinery from places where the coascervate has reported as waste, humates may inadvertently find their way back into the plant since the poly-DADMAC/humate coascervate resolubilizes when the caustic level of the liquor drops below approximately 150 g/L. This problem may not be significant at first due to the large liquor reservoir of the mud lakes; however, with continued disposal of the coascervate-coated residue, the "humate" level in lake water returned to the plant may increase substantially. Previous experience by a number of refineries with the mud lake disposal of calcium oxalate waste produced by lime addition to seed wash liquors has clearly demonstrated the potential for waste return to the refinery through lake water.

Regardless of the effectiveness of poly-DADMAC for humate precipitation, there may be a fundamental problem related to any technique which relies on humate removal alone as a method to control organic levels in process liquors. Recent work indicates that in the processing of Darling Range bauxites, the extractable organics solubilized in digestion have a molecular weight distribution comparable to the range or organics acids already present in the liquor. Therefore, in operations where it is suspected that the intermediate and low molecular weight organic species in the liquor are formed concurrently with the humates in digestion and not by a progressive degradation of the humate species, removing a small amount of humates by precipitation after digestion will have little effect on the overall concentration of organics in the liquor. Thus, as an "organic removal" technique, the effectiveness of poly-DADMAC used simply as a humate precipitant could be questionable.

The object of the present invention is to develop a technique using a cationic organic compound humates and lower molecular weight organic species from Bayer liquors.

A technical feasibility study was undertaken to examine the nature of the interaction between a cationic organic compound such as poly-DADMAC and the organics present in Bayer liquors.

SUMMARY OF THE INVENTION

DADMAC/Humate Precipitation Efficiency

Details of the mechanism by which poly-DADMAC functions to remove humates from Bayer liquor are not discussed in the Nalco/Kaiser patent which covers the process. All that is claimed in the patent is that the addition of the cationic reagent to the liquor produces a viscous, humate containing, insoluble precipitate which, when formed in conjunction with specific types of waste solids, can be easily removed from the system.

DETAILED DESCRIPTION OF THE PREFERRED EMBODIMENTS OF THE INVENTION

From the experimental data presented in the patent related to the efficiency of the poly-DADMAC for removing humates, reagent dosages as low as 56 mg/L (e.g. approximately 11 mg/L of cationic polymer since the original reagent was only 20% active) are claimed to remove as much as 27% of the humates from the liquor. Humate removal was determined solely by the reduction in colour of the liquor, as measured by visible spectrophotometric methods at 691 nm, before and after treatment with poly-DADMAC. Considering that humates can represent a significant portion of the organics present in Bayer liquors (i.e. approximately 5% of the 30–40 g/L TOC present in Alcoa-Kwinana liquor), it is doubtful that small amounts of poly-DADMAC are capable of removing large percentages of the total organic carbon from high TOC Bayer process liquors. Unfortunately, no TOC information or humate levels for the Kaiser/Gramercy liquor are given in the Nalco/Kaiser patent. Recent studies indicate that the actual humate precipitation capacity of poly-DADMAC for Alcoa of Australia Worsley & Queensland Alumina process liquors is far less than that reported in the Nalco/Kaiser patent for Kaiser/Gramercy liquors.

Figure 1:
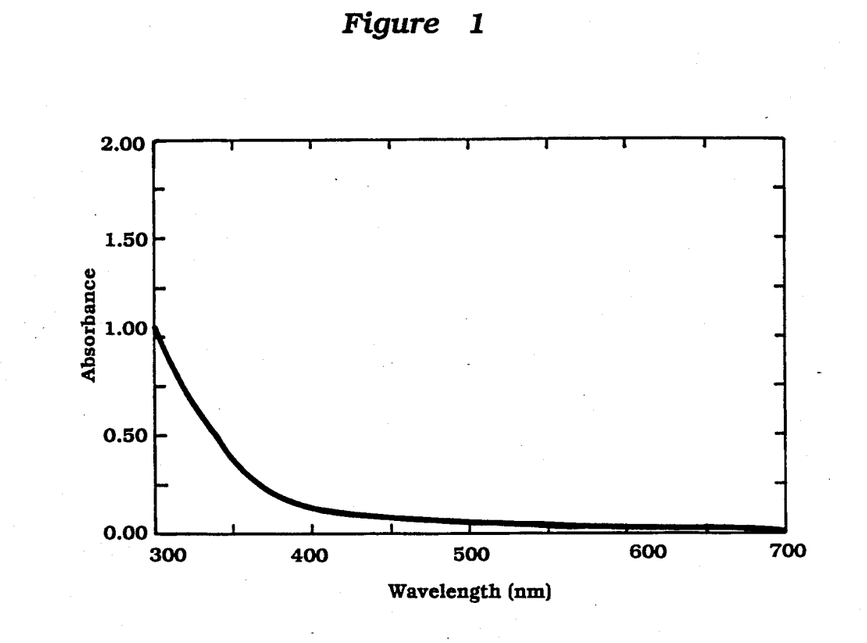
FIG. 1 is an graphical view showing the electronic absorption of Alcoa-Kwinana Green Liquor.

The electronic absorption spectrum of green liquor from the Alcoa-Kwinana refinery is shown in FIG. 1 of the drawings.

A single low intensity absorbance with a shoulder at $\lambda_{max}$ 430 nm is observed. However, in the ultraviolet region, liquor absorbance increases dramatically and there is a strong absorption band, with a shoulder at 310 nm, attributable to electronic transitions characteristic of the organic contaminants in the liquor. The absorbance value at 310 nm is more useful for determining organic removal from Bayer liquors than the absorbance value at 690 nm since not all organics in the process liquor are coloured species. Although the absorbance value at 310 nm is due, in large part, to complexes other than humates (e.g. Alcoa Research and Development has evidence that the highest molecular weight "humates" contribute only 10–15% of the absorbance value at 310 nm), it is the change in absorbance at 310 nm upon treatment of the liquor with poly-DADMAC that is significant for organic removal determination. Since poly-DADMAC is capable of forming precipitates only with high molecular weight "anionic" species, any reduction in liquor absorbance at 310 nm upon poly-DADMAC addition must be due to "humate" removal from the liquor.

To examine the ability of poly-DADMAC to precipitate humates from Bayer liquor, the UV-Vis spectra obtained before and after treating Alcoa-Kwinana green liquor with 0–1000 mg/L of poly-DADMAC were recorded. The change in absorbance at 310 nm was used to calculate the reduction in humate levels. The results are listed in Table 1.

TABLE 1

| | Humate Removal Using poly-DADMAC | | |
|---|---|---|---|
| poly-DADMAC Treatment (g/L) | % Reduction in 310 nm Absorbance | % Reduction in 690 nm Absorbance | % Humates Removed[a] |
| 0.1 | 0.6 | — | 4 |
| 0.2 | 2.1 | 13.2 | 14 |
| 0.3 | 2.7 | 15.7 | 18 |
| 0.4 | 3.2 | 16.7 | 21 |
| 0.5 | 3.8 | 19.7 | 25 |
| 1.0 | 4.4 | 26.3 | 30 |

[a]Calculated values based upon an assumption that humates contribute 15% of the total absorbance at 310 nm.

The calculated reduction in humate levels are in reasonable agreement with the reduction in liquor absorbance at 690 nm. However, total organic carbon analyses on liquor samples before and after treatment with poly-DADMAC indicate no differences in organic contamination, as shown in Table 2, even though there is a noticable reduction in liquor colour at the higher polymer dosages.

TABLE 2

| Liquor Total Organic Carbon Analyses (TOC) | |
|---|---|
| poly-DADMAC Treatment (g/L) | TOC (g/L) |
| 0 | 39.5 |
| 0.1 | 39.8 |
| 0.4 | 42.6 |
| 0.5 | 41.9 |
| 1.0 | 41.4 |

The results from the electronic absorption and TOC analyses suggest that a small portion of the humate species are responsible for a large amount of the colour and that poly-DADMAC preferentially attacks only these highly coloured humates. Although there is a significant reduction in liquor colour upon treatment with small amounts of poly-DADMAC, there is no significant reduction in the organic carbon levels.

To further quantify the ability of poly-DADMAC to remove organics from Bayer liquor, precipitates were formed by the addition of small amounts (<1 g/L) of a commercial poly-DADMAC reagent) and DADMAC polymer solids (prepared by drying a commercial reagent overnight at 80° C.) to Bayer liquors. The precipitates formed when addition of the next commercial reagent were collected, dried and analysed for both poly-DADMAC and organic content. Polymer content was determined by ion-exchange chromatography (Amberlite IR-400 cation exchange resin) and organic content by gravimetric analysis (precipitation of organics using calcium chloride). The composition of the precipitates was found to be nearly identical, regardless of the level of poly-DADMAC added to the liquor. A typical analysis of the poly-DADMAC/organic precipitate (dried overnight at 80° C.) is shown in Table 3. The "salt" component of the precipitates is due to Bayer liquor trapped in the viscous coascervate.

TABLE 3

| DADMAC/Organic Precipitate Analysis | |
|---|---|
| Component | Weight % |
| DADMAC | 72 |
| Organics | 18 |
| Salts | 10 |

Addition of finley ground DADMAC polymer solids to process liquors resulted in no coascervate formations. The polymer itself is insoluble in the caustic liquor and would not disperse.

Results from the coascervate analyses indicate that the poly-DADMAC organic interaction appears to be specific, at a mass ratio of approximately 4:1, over a wide polymer dosage range. Thus, commercial poly-DADMAC is capable of removing only about 5% of its weight (25% of its weight on a dry polymer basis) in organics.

DADMAC/Organic Interaction

Figure 2:
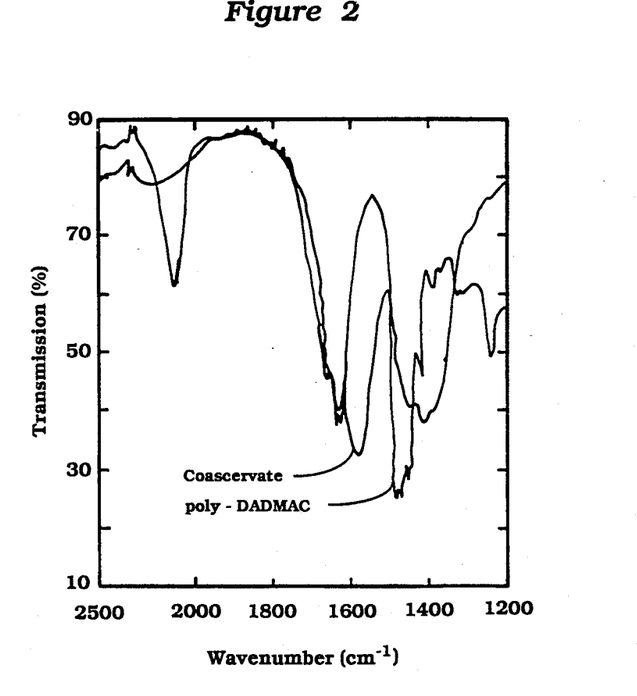
FIG. 2 is a graphical analysis showing the infrared spectra of poly-DADMAC and poly-DADMAC/Organic Coascervate.

The infrared spectra of poly-DADMAC and the poly-DADMAC/organic coascervate, shown in FIG. 2, can be used to examine the nature of the interaction between the cationic polymer and the organic contaminants in the liquor.

There are no substantial differences in the major absorption peaks attributable to the cationic polymer ($\nu_{C-N}$ at 1635 cm$^{-1}$ and $\nu_{-CH_2-}$ at 1480 cm$^{-1}$) between poly-DADMAC in the coascervate. Thus, it appears that no degradation of the poly-DADMAC occurs upon contact with Bayer liquor. Furthermore, the broadening of the $(CH_3)_2N^+$ vibrational band at 2115 cm$^{-1}$ and the presence of strong carbonyl stretching bands at 1580 cm$^{-1}$ (asymmetric $\nu_{C=O}$) and 1400 cm$^{-1}$ (symmetric $\nu_{C=O}$) characteristic of carboxylate salts suggests that the interaction between the DADMAC polymer and the organic species in the coascervate takes place through a simple metathetic reaction between the sodium salt of the organic acids and the chloride salt of the cationic polymer according to:

$$nNaR'_{aq} + RCl_{aq} \rightarrow RR'_{n\ ppt} + NaCl_{aq} \qquad (1)$$

where NaR' is the organic acid salt, RCl is poly-DADMAC and RR'$_n$ is the coascervate precipitate.

The number or organic species (n) involved in the precipitation reaction with each DADMAC polymer cannot be determined quantitatively from infrared analysis. While gravimetric and chromatographic analyses on the precipitates have shown that the complex is specific at 4:1 (DADMAC:organic) by weight, the uncertainty in the formula weights of both the polymer and organic species makes the assignment of a definite stoichiometry to the complex nearly impossible. However, with a DADMAC monomer formula weight of 126 and an organic molecular weight assumed to be greater than 500 (i.e. assuming "humates" are precipitated), the complex cannot be 1:1 on a cationic-to-anionic charge basis since the weight percentage of organic in the coascervate would have to be far in excess of that of the polymer. Analyses of ashed samples of the poly-DADMAC/organic precipitate by XRD show the ash to be predominantly sodium chloride with only minor amounts of sodium carbonate and sodium aluminate. These results indicate that there is a substantial amount of unreacted quaternary ammonium functionality in the coascervate. Therefore, it appears that the metathetic reaction between the organics and the poly-DADMAC is far from stoichiometrically complete.

The inefficiency in the precipitation does not appear to be a kinetic problem since compositional analyses of both freshly precipitated coascervate and of coascervate left in contact with the liquor for three days show no substantial differences. Furthermore, neither dilution of the poly-DADMAC reagent with water before addition to liquor nor lengthy, violent mixing of the reagent with the liquor produce any appreciable differences in either the infrared spectra or the poly-DADMAC/humate ratio in the coascervates. Therefore, the organic precipitation inefficiency appears to be related to either a polymer structural problem or to the solubility of the poly-DADMAC/organic complexes in the liquor.

The ability of cationic polymers to precipitate high molecular weight anionic species, particularly acrylate polymers, from solution is well known. The precipitation occurs via the formation of a complex, insoluble salt (coascervate) between the cationic and anionic species.

However the anionic species must be very high in molecular weight or the resulting salt will be too soluble to precipitate from solution. The apparent inefficiency in the precipitation of the various organic species from Bayer liquor probably suffers from this problem. It appears that the highest molecular weight organic contaminants (i.e. the intensely coloured "humate" species) readily precipitate upon contact with the DADMAC polymer, while the complexes formed with the lower molecular weight organics are too soluble to precipitate from the liquor. Thus, only the highly coloured humate species are actually removed by low-level poly-DADMAC treatment of the liquor.

Precipitation tests conducted by adding poly-DADMAC reagent to both raw caustic and synthetic liquor suggest that the cationic polymer readily precipitates from any highly caustic solution. The precipitates are viscous, pale-yellow pastelike solids which are identical, rheologically, to the dark brown coascervate formed when the DADMAC polymer precipitates from Bayer liquors. Infrared analyses confirm the precipitates as primarily the DADMAC polymer. Furthermore, "moisture" analyses on the polymer precipitates compare favourably with those of the coascervates (i.e. 50% moisture) and the precipitates entrain liquor solids (i.e. the "salts" listed in Table 3) similar to the coascervate. Thus, it appears that the actual mechanism for the coascervate formation is not directly related to the insolubility of a poly-DADMAC/organic coascervate in Bayer liquor but involves the binding of specific organic species to the DADMAC polymer as the polymer precipitates from the caustic solution. The precipitated DADMAC polymer is functioning identically to a anion exchange resin except that the DADMAC is a viscous dispersible solid.

This is significant since the implications are than any poly-DADMAC added to the liquor must be well dispersed to create large amounts of polymer/liquor interfacial contact to optimize organic removal efficiency.

Liquid Ion Exchange Process Development

As a result of (1) the inefficient organic removal capacity of poly-DADMAC, (2) the insoluble, liquid form of the poly-DADMAC/organic coascervate, (3) the salt-type interaction between poly-DADMAC and the organic species in the precipitate, (4) the lack of any poly-DADMAC degradation upon contact with Bayer liquor, and (5) the expense involved in a "single-pass" use of large quantities of poly-DADMAC, there was considerable incentive for developing a technique of using poly-DADMAC for organic removal to include a process to recover the poly-DADMAC for recycle. Considering the chemical structure of poly-DADMAC and polymerisation process by which it is prepared, a liquid ion exchange process was considered the most effective method for utilising poly-DADMAC.

Poly-DADMAC (poly[N,N-dimethyl-3,5-methylenepiperidinium chloride]) is a water soluble, high molecular weight polymer having a linear chain of repeating rings which contain quaternary ammonium groups.

poly-DADMAC

Structure of poly-DADMAC.

Structure of poly-DADMAC

The polymer is prepared by the free radical polymerization of diallydimethylammonium chloride using t-butylhydroperoxide as a catalyst (Butler U.S. Pat. No. 3288770). The polymerisation process used for poly-DADMAC is almost identical to that used to prepare the insoluble, highly cross-linked quaternary ammonium polymers that are used as cationic exchange resins. Therefore, with respect to certain anionic species, poly-DADMAC can be considered to be a water soluble, ion exchange polymer. However, it would be impossible to use the DADMAC polymer industrially as an ion exchanger, except perhaps as an expensive anion sequesterant unless the polymer could be separated from solution for regeneration in a subsequent unit operation. The extraction of solubilized poly-DADMAC from most process liquors would be extremely difficult. Under the high caustic conditions of Bayer process liquors, however, poly-DADMAC is highly insoluble and the reaction between the precipitated poly-DADMAC and the high molecular weight organics produces a salt-type coascervate. Although the coascervate is actually a hygroscopic solid, the precipitate always contains enough trapped liquor to render it a viscous, oily liquid. Using the low levels of poly-DADMAC addition (<400 mg/L) and the application method suggested in U.S. Pat. No. 4578255, the poly-DADMAC/humate coascervate is dispersed in the liquor and readily adsorbs onto certain types of process solids. However, if substantially larger quantities of poly-DADMAC (>10 g/L) are used in a process stream free from solids, the precipitate will separate from the liquor and form an immiscible, supernatant layer. This layer can be readily removed from the treated liquor by decantation. The insolubility of the complex poly-DADMAC/organic "liquid" in Bayer liquor and the tendency to form a supernatant layer provide a unique opportunity to utilize the commercial poly-DADMAC reagent in a process not previously considered.

Thus in one form the invention resides in a process for reducing the concentration of humate type organic impurities in Bayer process liquors which method comprises diverting part of a stream of Bayer process liquor into a side stream, contacting the side stream with a sufficient quantity of an organic cationic compound polymer which is immiscible with the process liquor to form a two phase system, one phase containing the cationic compound together with an insoluble adduct formed by reaction between the quaternary salt and the humate type organic impurities and the other phase containing the soluble aluminium compounds, separating the two phases, returning the separated other phase to the stream of Bayer process liquors and treating the separated one phase to recover the cationic compound for recycling.

The peferred cationic compound is a polymer such as poly-DADMAC. Solvent extraction is a process applicable in any instance where it is desirable to selectively remove or extract a species from one solution into another. This can apply either to the removal of a valuable component from a waste solution or, as in the case of organic removal from Bayer liquor, to the removal of a contaminant from a valuable solution. However, the solution originally containing the desired species and the solution into which this species is to be extracted must be immiscible. Furthermore, one of the immiscible layers must contain an extractant, or the solvent itself must be an extractant, in order for the desired species to concentrate in that layer.

In most solvent extraction processes, the extraction step involves contacting an aqueous phase containing the substance to be extracted and an immiscible organic layer containing the extractant. If the solvent extraction reaction involves the exchange of ionic species between the immiscible phases, it is termed liquid ion exchange. Liquid ion exchange reactions are generally described by:

$$RX_{aq} + HL_{org} + \rightarrow RL_{org} + HX_{aq} \quad (2)$$

where RX is the aqueous species to be extracted, HL is the organic phase extractant and RL is the extracted complex.

The extraction of humates from Bayer liquor into the immiscible layer formed when a sufficient quantity of poly-DADMAC is added is a novel modification to the basic liquid ion exchange technique. The water soluble, cationic reagent is converted in an in situ process to an insoluble, organic phase in which the DADMAC polymer functions as the organic extractant. Thus, the poly-DADMAC/organic complex formed is not a "precipitate" as described in the Nalco/Kaiser patent but is solubilized in a separate, immiscible organic layer. By separating this "contaminant-loaded" organic layer from the treated Bayer liquor, organics are removed from the system.

For the poly-DADMAC/organic system, the extraction reaction is a liquid ion exchange process similar to Equation 1.

$$nNaR'_{aq} + RCl_{aq} \rightarrow RR'_{n\ org} + NaCl_{aq} \quad (3)$$

The poly-DADMAC (RCl) and organic salt (NaR') are both aqueous species initially but the resultant poly-DADMAC/organic coascervate (RR'$_n$) is in an immiscible, supernatant "organic" phase.

Figure 3:
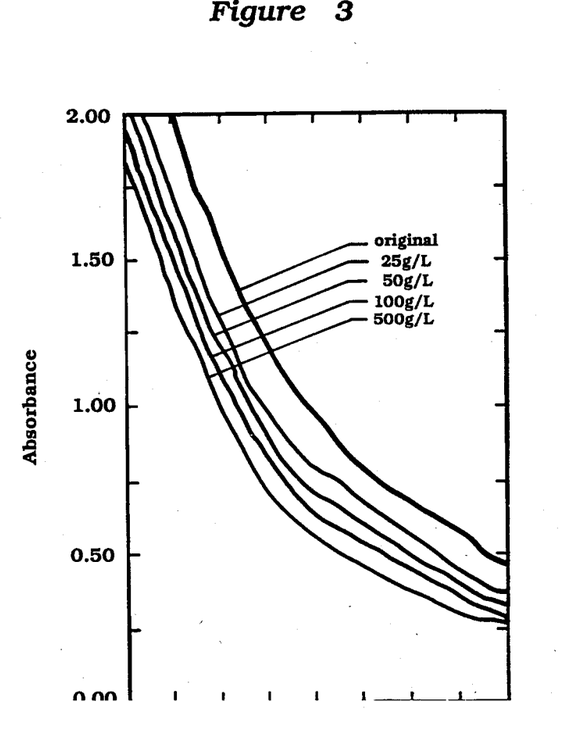
FIG. 3 is a diagrammatic view showing the electronic absorption spectra of Alcoa-Kwinana Process Liquor after extraction with poly-DADMAC.

To quantify the ability of poly-DADMAC to function as an organic extractant, the electronic absorption spectra obtained upon the extraction of process liquor (80° C.) with poly-DADMAC are shown in FIG. 3.

Figure 4:
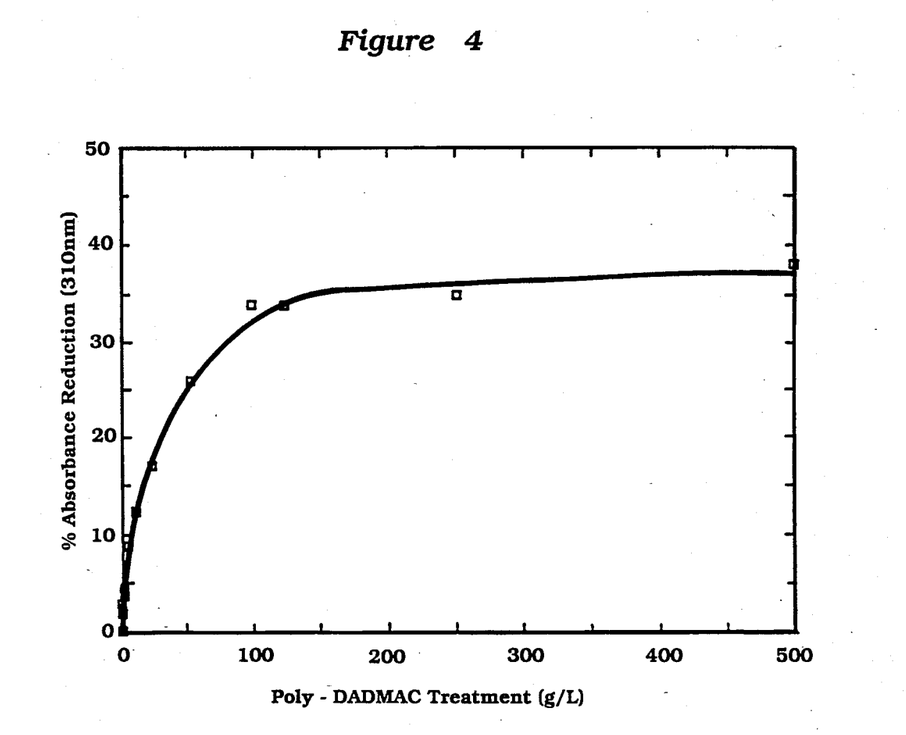
FIG. 4 is a diagrammatic view showing the organic removal from Alcoa-Kwinana Process Liquor by poly-DADMAC extraction.

Substantial reductions in the absorbance values at 310 nm indicate that significant quantities of organics are being removed from the liquor. A plot of the change in liquor absorbance at 310 nm as a function of poly-DADMAC treatment, for a wide range of polymer dosages, is shown in FIG. 4.

Below 50 g/L of poly-DADMAC reagent treatment (i.e. 10 g/L polymer solids), organics are readily extracted from the liquor. Above 50 g/L, the organic extraction capability of poly-DADMAC beings to drop, while above 100 g/L, little additional organics can be extracted from the liquor regardless of the level of poly-DADMAC treatment. Thus, it appears that the poly-DADMAC extraction technique is limited to very specific types of the organic contaminants in the liquor.

Studies conducted recently have shown that the "humates" in Alcoa-Kwinana green liquor contribute only 10-15% to the total absorbance value at 310 nm. The remaining 85-90% of the absorbance value is due entirely to lower molecular weight organic species. The results from the CSIRO extraction studies, presented in FIG. 4, show that a 15% reduction in liquor absorbance at 310 nm is achieved at low polymer levels (i.e., 18% 310 nm absorbance reduction at 25 g/L treatment), consistent with the concept that the high molecular weight "humates" are readily complexed by the DADMAC polymer. At higher levels of poly-DADMAC treatment (i.e. 100 g/L reagent or 20 g/L polymer) as much as 40% reduction in liquor absorbance at 310 nm can be achieved, indicating that substantial amounts of the lower molecular weight organic species can be removed.

Considering the relative contribution of each of the organic types to the total absorbance value at 310 nm, it appears that as much as 10-15% total organic carbon removal is possible using the poly-DADMAC extraction technique. Furthermore, those organics extracted may include a substantial amount of the species responsible for the most severe "organic" problems in the refinery. Detailed liquid chromatographic analyses recently performed on process liqors which have been extracted using the process by Alcoa of Australia suggest this is occurring.

The results from the extraction studies support earlier conclusions that certain of the highly coloured, high molecular weight humate species are much easier to extract from the liquor than others, presumably since the salts formed with poly-DADMAC are extremely insoluble in the caustic liquor. Once these very high molecular weight species are extracted, considerably higher levels of poly-DADMAC are required to remove the intermediate molecular eight organics. These levels of poly-DADMAC addition to process liquor are practical only using the liquid ion exchange technique. However, no amount of poly-DADMAC treatment will remove the lowest molecular weight organics since the salts formed are too soluble undergo the ion-exchange necessary for the organics to be extracted.

Figure 5:
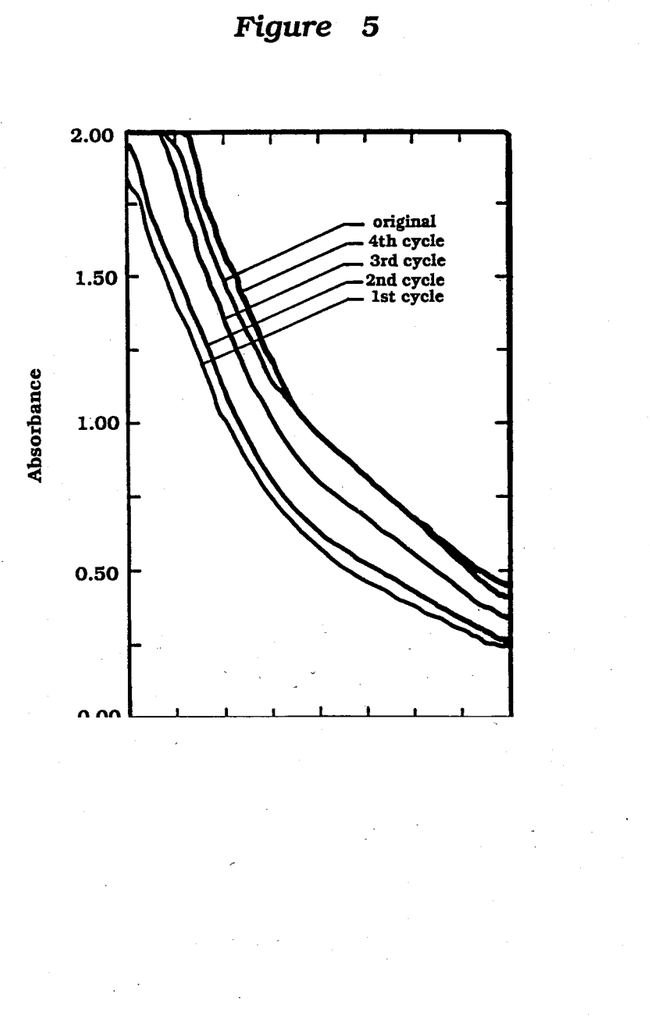
FIG. 5 is a diagrammatic view showing the repeated extraction of Process Liquor using 500 g/L poly-DADAMAC.

In an attempt to determine whether the limitation in organic removal using the poly-DADMAC extraction technique is due to the molecular weight of the organic species or to a problem with the cationic polymer, an extreme level of poly-DADMAC treatment (i.e. 500 g/L reagent), with a "humate" removal capacity far in excess of the "humate" level in the liquor, was used to extract oxalate crystallizer feed liquor. After separating the contaminant-loaded organic layer from the treated liquor, the organic layer was contacted with fresh oxalate feed liquor for additional loading. This process was repeated until no further changes in the electronic absorption spectra occurred, as shown in FIG. 5, indicating the organic removal capability of the poly-DADMAC had been reached (i.e. the organic layer was fully loaded under the given liquor conditions).

As seen from the electronic absorption spectra, the organic layer is capable of extracting substantial amounts of organics from the liquor after the first loading. Although the organic extraction capability of the organic layer drops after the first loading, presumably due to an organic distribution between the liquor and the organic layer, it is not until the fourth cycle that the organic layer becomes fully loaded and incapable of additional organic extraction. Similar results are obtained for 100 g/L, 50 g/L and 25 g/L extractions, as shown in Table 4. These results suggest that the organic removal limitation using the poly-DADMAC extraction technique is the result of both an organic contaminent partitioning problem and the inability of poly-DADMAC to form insoluble salts with many of the intermediate and low molecular weight organic species.

TABLE 4

| Contaminant Loading of Organic Layer | | |
|---|---|---|
| poly-DADMAC Treatment (g/L) | Cycle | % Reduction in 310 nm Absorbance |
| 25 | 1 | 18 |
|  | 2 | 12 |
|  | 3 | 7 |
|  | 4 | 0 |
| 50 | 1 | 26 |
|  | 2 | 12 |
|  | 3 | 8 |
|  | 4 | 0 |
| 100 | 1 | 34 |
|  | 2 | 11 |
|  | 3 | 9 |
|  | 4 | 0 |
| 500 | 1 | 38 |
|  | 2 | 35 |
|  | 3 | 17 |

TABLE 4-continued

| Contaminant Loading of Organic Layer | | |
|---|---|---|
| poly-DADMAC Treatment (g/L) | Cycle | % Reduction in 310 nm Absorbance |
|  | 4 | 0 |

To confirm the inability of poly-DADMAC to extract low molecular weight organic species, oxalate feed liquor was repeatedly extracted with 125 g/L additions of the cationic reagent. The first extraction resulted in a 33% reduction in 310 nm absorbance while the second extraction increased the 310 nm absorbance reduction to 38%. However, after the second extraction, no additional organic removal (as measured at 310 nm) could be effected regardless of the number of extractions attempted. Thus, it appears that poly-DADMAC is incapable, of extracting certain of the organic species contaminating the Alcoa-Kwinana liquor. Presumably, the remaining organics are the low molecular weight species which will not form insoluble salts with the cationic polymer under the existing liquor conditions.

The final volumes of the organic phases, after extraction and settling, is approximately 50% of the initial poly-DADMAC reagent volume added. Although the aqueous component of the commercial reagent (i.e., approximately 80%) is completely lost to the Bayer liquor, the organic phase entrains sufficient liquor to render the supernatent layer a liquid. A typical analysis of one of the poly-DADMAC extractions in shown in Table 5.

TABLE 5

| Organic Layer Analysis | |
|---|---|
| Component | Weight % |
| H$_2$O | 50 |
| DADMAC | 35 |
| Organics | 9 |
| Salts | 6 |

On a dry basis, this analysis is virtually identical to that of the insoluble precipitates formed at the low poly-DADMAC levels discussed in the Nalco/Kaiser patent (e.g. <400 mg/L), further indicating that the poly-DADMAC/organic interaction is reasonably specific at 4:1 (by mags) over a wide polymer-dosage range. Furthermore, quantitative infrared analysis on the organic layers indicate no significant differences in the poly-DADMAC/humate ratio until polymer treatments greater than 25 g/L are employed. From mass balances performed on the extracted layers at long settling times, virtually all the poly-DADMAC added to the liquor can be recovered, although some poly-DADMAC losses are experienced at short settling times due to incomplete phase separation. Both the "salts" and the high moisture level in Table 5 can be attributed to liquor entrained in the organic phase. However, it appears that the solubility of Bayer liquor solids in the organic layer is substantially reduced by the strong organic character of the immiscible phase since the total dissolved solids level of the entrained liquor (i.e. approximately 12%) is considerably less than that of Bayer liquor (i.e. approximately 45%). Thus, the organic character of the supernatant layer alone may be responsible for extracting organics other than traditional "humates" from the liquor (i.e. lower molecular weight species).

After the organic layer has been settled and separated from the treated liquor, the poly-DADMAC component can be recovered for recycle by "stripping" the organic phase. Generally, in liquid ion exchange processes, stripping is accomplished by reversing the extraction reaction shown in Equation (2). However, in the poly-DADMAC/organic liquid ion exchange process described in Equation (3), the DADMAC polymer can be readily recovered from the organic phase by yet other novel modification to the basic solvent extraction technique.

The extreme insolubility of alkali metal salts of high molecular weight organic acids and the solubility of the poly-DADMAC/organic coascervate in low caustic, aqueous liquors permits poly-DADMAC to be quantitatively regenerated by another metathetic reaction, (4)

where $MCl_{aq}$ is an alkali metal halide and $MR'$ is the corresponding alkali metal organic salt. The poly-DADMAC is recovered as an aqueous solution while the organics are precipitated quantitatively as insoluble salts (i.e., Mg, Ca or Ba). Infrared analyses on "stripped" samples of the organic phase confirm that precipitates to be alkali metal organic salts while XRD on ashed samples of the precipitates indicate the corresponding alkali metal carbonate. Infrared analysis on the regenerated poly-DADMAC solution confirms the cationic polymer recovery.

In the stripping operation, the alkali metal salt is best added as a hot, (not lower that 50° C.) concentrated aqueous solution to a hot, aqueous solution of the poly-DADMAC/organic-containing organic phase. Recovery of the poly-DADMAC using this precipitation technique is extremely effective since the reaction between the organics and the alkali metal salts is quantitative. However, some losses can be expected due to incomplete precipitation if insufficient mixing is used.

After precipitation of the organics and regeneration of the poly-DADMAC in the stripping stage, the organic solids must be separated from the poly-DADMAC solution so that the polymer can be recycled to the extraction stage for further organic removal. The concentration of both the organic solids and the poly-DADMAC in the recovered strip solution depends upon the amount of dilution water used. Unfortunately, due to the extreme viscosity of concentrated poly-DADMAC solutions, if insufficient dilution water is used in stripping, the precipitated alkali metal-organic complexes will not readily settle. Although the organic complex settling can be enhanced by the addition of small amounts of an acrylamide containing flocculant to the strip circuit, the solid/liquid separation operation may require a process other than thickening for most efficient recovery of the poly-DADMAC. From preliminary laboratory tests, centrifugal filtration offers significant advantages as a separation method for poly-DADMAC recovery.

Liquid Ion Exchange Process

Figure 6:
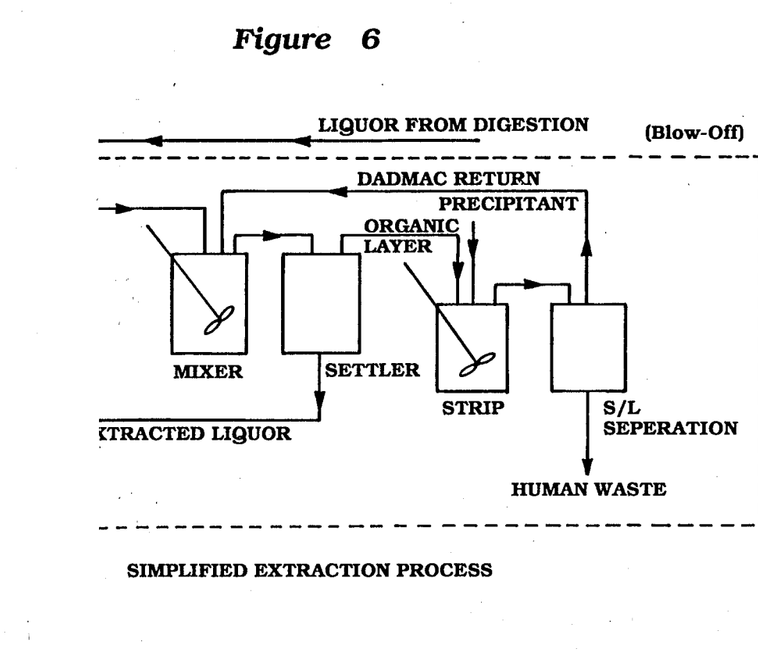
FIG. 6 is a schematic view showing the simplified extraction process and the equipment therefor.

Based upon the information developed in this work, a simplified liquid ion exchange process for organic removal from Bayer liquor, using poly-DADMAC as the extractant, is shown diagrammatically in FIG. 6.

A small, liquor side-stream that is free from solids (e.g. from the Kelly or sand filters or from oxalate crystallisation feed) is contacted with poly-DADMAC in a violently agitated mixer to "extract" the organics. The emulsion formed in the mixer then reports to the settler for phase disengagement. After settling of the poly-DADMAC/organic loaded "organic" layer, the treated plant liquor is returned directly to the plant. However, provided a sufficiently large settling tank is used (estimates are for a tank which will provide at least a two hour residence time for the liquor), poly-DADMAC losses should be minimal. Settling studies conducted as part of the liquid ion exchange process development have shown that using an "inverse sludge bed" approach for a settler design gives excellent liquid/liquid separation results. This technique involves introducing the emulsion from the extraction stage to a quiescent zone within the separated organic layer so that the organic layer assists in the liquid/liquid separation by helping to coagulate the incoming organic phase. Thus the organic layer acts as a "sludge bed" by filtering the organic phase away from the permeating, treated liquor, dramatically enhancing the settling operation.

The organic-loaded organic phase, after extraction and settling, reports to the strip circuit for poly-DADMAC regeneration. In the strip tank, the organic phase contacts a concentrated aqueous solution of an alkali metal salt "precipitant" where the poly-DADMAC is regenerated and the organic contaminants are precipitated as the insoluble alkali metal organic salts. The resulting solid-liquid suspension then reports to a solid/liquid separation step for poly-DADMAC recovery.

In the solid/liquid separation circuit, the poly-DADMAC is recovered and sent back to the mixer/settler for additional organic extraction while the alkali-organic waste is separated and destroyed. Furthermore, the process liquor entrained in the organic phase during the extraction operation is recovered in the solid/liquid separation step and returned to the process stream via the poly-DADMAC recycle. The solid/liquid separation process may utilize a thickener, a press filter, or a centrifugal filter depending upon the solids concentration in the strip circuit. If a high-solids poly-DADMAC solution is desired for recycle to extraction (i.e. to avoid excessive usage of dilution water) a physical separation method that can handle high viscosity solutions with suspended solids may be used.

The results from the preliminary research aimed at developing the liquid ion exchange process for organic removal are encouraging. It is possible that the technique could be made industrially viable. The side-stream necessary for implementing the process could be extremely small and the entire unit operation may only require a minor capital investment. From estimates of poly-DADMAC usage during the evaluation of the Nalco/Kaiser process at Alcoa-Wagerup (25/100 ppm to the full plant flow) and from data generated in this work treatment of a small side stream with 100 g/L poly-DADMAC would give significantly better organic removal results than those obtained during recent plant evaluation of the Nalco/Kaiser process. Since virtually all of the poly-DADMAC used in the extraction process should be recovered, and only small amounts should be needed for make-up, treatment of the liquor with very high levels of poly-DADMAC should be possible. Such extractions might provide enormous benefits with respect to organic removal of both the high and medium molecular weight species.

Whilst the specification has thus far discussed only poly-DADMAC as the extractant other cationic organic compounds (and particularly polymeric quaternary salts) which are immiscible with the Bayer process liquor may be used.

Specifically, the following commercially available polymers may be used.

poly[(dimethylimino)trimethylene(dimethylimino)-hexamethylene dichloride]

poly(4-vinylbenzyltrimethyl ammonium chloride)

poly(N,N—dialkyl-3,5-methylenepiperidinium chloride)

poly(N—methyl-3-vinylpyridinium chloride)

poly(N,N—dimethyl-4-vinylpiperidinium chloride)

poly(N—methyl-2-vinylpyridinium chloride)

poly(N—methyl-4-vinylpyridinium chloride)

The claims defining the invention are as follows:

1. A process for reducing the concentration of humate type organic impurities in Bayer process liquors, which method comprises diverting part of a stream of Bayer process liquor into a side-stream which is free from solids, adding an organic cationic compound which is immiscible with the process liquor and forming an emulsion of cationic compound in said process liquor, whereby to form a two phase system, one phase containing an insoluble adduct formed by reaction between the cationic compound and the humate type organic impurities together with any remaining unreacted cationic compound and the other phase containing the soluble aluminium compounds, separating the two phases, returning the separated other phase to the stream of Bayer process liquors and treating the separated one phase to recovery the cationic compound for recycling.

2. A process as claimed at claim 1 wherein the organic cationic compound is a polymer.

3. A process as claimed in claim 2 wherein polymer is a quaternary ammonium polymer.

4. A process as claimed in claim 3 wherein the polymer is poly-DADMAC.

5. A process as claimed in claim 4 wherein the separated phase is treated with an alkali metal salt.

6. A process as claimed in claim 5 wherein the alkali metal salt is added as a hot aqueous solution to a hot aqueous solution of the separated phase.

7. A process as claimed in claim 3 wherein the separated phase is treated with an alkali metal salt.

8. A process as claimed in claim 7 wherein the alkali metal salt is added as a hot aqueous solution to a hot aqueous solution of the separated phase.

9. A process as claimed in claim 2 wherein the polymer is poly-DADMAC.

10. A process as claimed in claim 9 wherein the separated phase is treated with an alkali metal salt.

11. A process as claimed in claim 10 wherein the alkali metal salt is added as a hot aqueous solution to a hot aqueous solution of the separated phase.

12. A process as claimed in claim 2 wherein the separated phase is treated with an alkali metal salt.

13. A process as claimed in claim 12 wherein the alkali metal salt is added as a hot aqueous solution to a hot aqueous solution of the separated phase.

14. A process as claimed in claim 1 wherein the separated phase is treated with an alkali metal salt.

15. A process as claimed in claim 14 wherein the alkali metal salt is added as a hot aqueous solution to a hot aqueous solution of the separated phase.

* * * * *